Oct. 25, 1960 A. J. RACK 2,957,943

PULSE CODE DEVICE

Filed June 9, 1958 2 Sheets-Sheet 1

INVENTOR
A. J. RACK
BY Walter M. Hill
ATTORNEY

Oct. 25, 1960 A. J. RACK 2,957,943

PULSE CODE DEVICE

Filed June 9, 1958 2 Sheets-Sheet 2

INVENTOR
A. J. RACK
BY Walter M. Hill
ATTORNEY

United States Patent Office 2,957,943

Patented Oct. 25, 1960

2,957,943

PULSE CODE DEVICE

Alois J. Rack, Millington, N.J., assignor to Bell Telephone Laboratories, Incorporated, New York, N.Y., a corporation of New York Filed June 9, 1958, Ser. No. 740,906

7 Claims. (Cl. 178—43.5)

This invention relates to pulse code communication systems and more particularly, in an important aspect, to coding and decoding apparatus for establishing a counterpart relationship between a code group of pulses and a sample of a complex wave signal.

Pulse code techniques have brought manifold advantages to the communication arts. Chief among these advantages in the definiteness and certainty with which a pulse code signal may be transmitted. This definiteness and certainty springs from the unequivocal nature of the pulses which constitute a pulse code signal. Typically such code pulses are two-valued, and the presence of a pulse of the one value affirmatively indicates a particular bit of information while the absence of a pulse of that value, i.e., the presence of a pulse of the other value, affirmatively denies that bit of information.

Conveniently, such pulses may be arranged in code pulse groups of like duration, the interval allotted to each group being further subdivided into equal successive time intervals which are each assigned to the occurrence of a pulse having a particular informational significance.

Such pulse codes are well known in the art and are discussed in detail, for example, in A. J. Rack Patent Number 2,514,671, granted July 11, 1950. As there considered, an instantaneous analog quantity lying within a preassigned range, for example, the instantaneous amplitude of a complex wave, may be represented by a code group of two-valued pulses arranged within a time interval in accordance with a pre-assigned code.

Following an illustrative widely employed code, the numerical significance of successive ones of such pulses in a code group is related by a factor of 2. Thus a code group of $n$ pulses may represent analog quantities within a range of $2^n$ values. For purposes of illustration, in accordance with this code a group of five pulses may represent a full amplitude range of $2^5$, or 32, amplitude values from zero to 31. These five pulses may be arranged within the code group interval to have successive numerical significances of 16, 8, 4, 2 and 1.

The well-known Nyquist Sampling Theorem expresses mathematically that any signal to be transmitted over a transmission channel of limited frequency bandpass characteristic may be represented, without derogation of its received waveform, by a succession of samples of that signal taken at interval of $1/(2f)$, where $f$ is the upperpost transmission frequency of the transmission channel employed. Since all physically realizable transmission channels are so frequency limited, it hence appears that advantage may be taken of the definiteness and certainty of pulse code techniques for the transmission of all signals upon the conditions that, first, samples are taken as often as dictated by the transmission capabilities of the available transmission channel; and, second, a necessary condition, much more difficult to realize, is that an accurate translation can be made between the code and the signal sample at a rate consistent with the taking of the signal samples. That is to say, both transmitting and receiving ends of a pulse code communication system, a counterpart relationship between a sample of a complex signal wave and a code group of pulses must be established rapidly.

Inherent in this translation between code and wave sample is the necessity of successively combining plural signals, either code pulses or wave sample, or both, in either additive or subtractive relation as the case may be. In view of the time significance of the pulses of such a code group, it is further necessary that these combining operations be performed in exactingly accurate time phase relationships. Otherwise the definiteness and certainty of pulse transmission is destructively employed to transmit inaccurate representations of the desired complex wave.

In the prior art, the accuracy with which these combining operations must be performed has led to the employment of delicately adjusted amplifiers and delay lines having broad frequency bandpass characteristics in order that signals passing therethrough might not have significant frequency components unequally delayed or unequally attenuated, thus to destroy the accuracy of the combining operation.

Since these combining operations are of a necessity plural, in dependence upon the number of code pulses in a group, many of the prior art structures have proportionately multiplied the cost of pulse coding and decoding apparatus with the plural use of the expensive circuit components required to permit the desired accuracy in performing the desired combinations.

Particularly effective circuitry for establishing the desired counterpart relationship between a code pulse group and complex wave sample is taught, however, by R. L. Carbrey in patents numbered 2,806,997 and 2,806,950, both granted September 17, 1957. These patents respectively teach pulse coding and decoding apparatus in which signals to be combined are repetitively circulated through a single circuit. Thus, the Carbrey apparatus eliminates the need for duplication of expensive and delicately adjusted circuit components.

It is a principal object of the present invention, however, to improve the simplicity of apparatus necessary to establish the desired counterpart relationship between a code group of pulses and a sample of a complex signal wave.

With this simplification, it is a further object of the invention to enhance the accuracy of the combining operations, to eliminate duplication of circuit elements and further to achieve these objectives with a structure which is readily adaptable to translate reciprocally between a code pulse group and a wave sample.

These and other objects are achieved, in accordance with the invention, by a structure centered about a normally quiescent oscillator having, when energized, an increasing amplitude characteristic. This oscillator is rendered active, through circuits of the invention, by the signal for which a counterpart is desired and successive oscillator excursions are adjusted in amplitude by further circuits for combining these oscillations with the successive pulses of the code pulse group.

Thus, in accordance with the invention, the amplitude of the oscillator output signal is a measure of the complex wave sample and the single frequency oscillator signal may be accurately combined with code pulse signals passed through channels having only the most elemental frequency transmission characteristics.

By way of example and for purposes of illustration, in a preferred embodiment of the invention adapted for encoding a wave sample, that sample is applied to energize an antiresonant element tuned to a frequency corresponding to the pulse repetition frequency of a preassigned code. This tuned element is connected in circuit with a signal amplifier, such as a transistor, in a positive feedback relationship such that oscillations within the tuned element successively increased in amplitude by a factor of 2.

These oscillations are applied in triggering relationship to a threshold responsive pulse generator. This generator is biased to respond to trigger signals at or above a level corresponding to the largest amplitude represented by a single pulse in accordance with the preassigned code. Pulses thus generated are applied both to a transmission channel and to a simple, narrow frequency bandpass, negative feedback network for reducing the next succeeding oscillatory excursion of the tuned element by an amount corresponding to this largest amplitude represented by a single pulse. Thus, by virtue of the increasing amplitude characteristic of the oscillator, successive pulses transmitted represent amplitudes related by an inverse factor of 2 in accordance with the preassigned code. Meanwhile, this same increasing amplitude characteristic of this single frequency oscillation admits of combination in exact phase relationship with the fixed amplitude transmitted pulse which is passed through an economical, narrow frequency bandpass channel. With this combination the structure of the invention accomplishes an accurate adjustment of the oscillatory amplitude in accordance with the preassigned code.

The invention will be more clear and other objects, features and advantages thereof will become apparent in the course of the following brief description of illustrative embodiments of the invention taken in connection with the drawings and with the appended claims.

Figure 1:
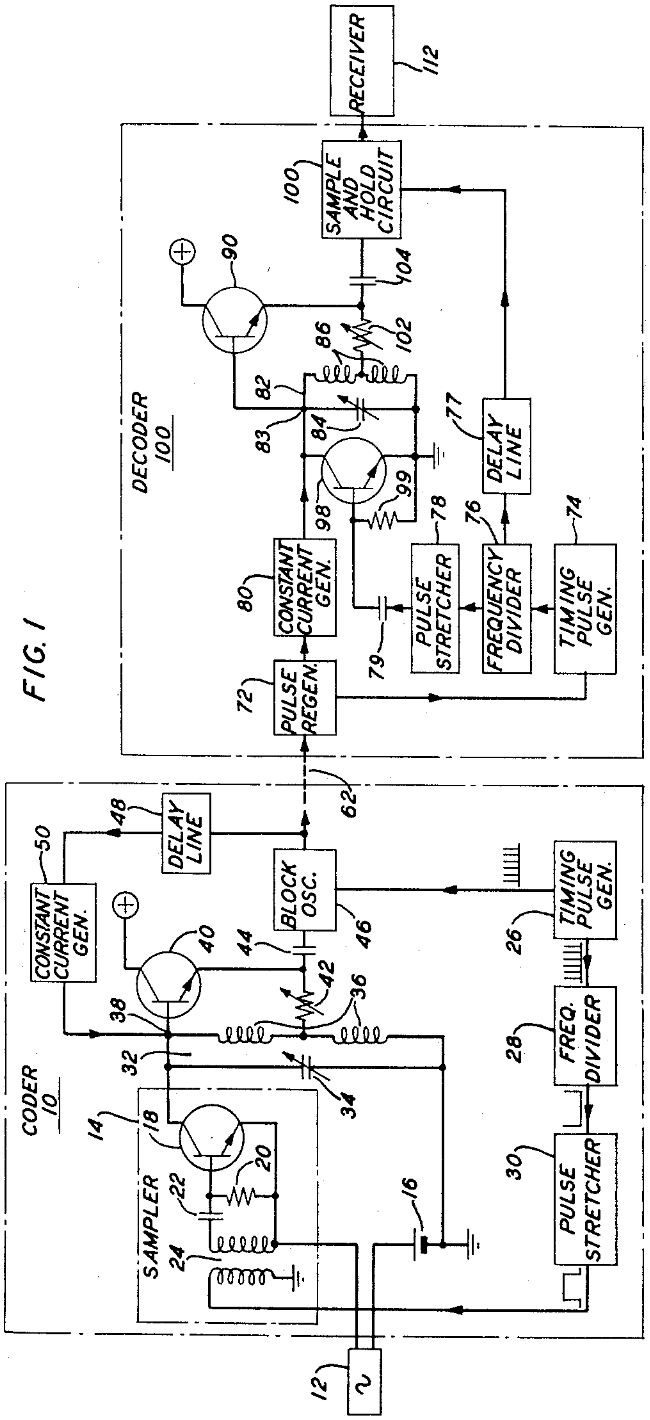
Fig. 1 is a partial schematic, block diagram of an illustrative code pulse transmission system constructed in accordance with the principles of the invention.

Referring now more particularly to the drawings, Fig. 1 shows an illustrative communication system which employs coding and decoding structures embodying principles of the invention. A low impedance source 12 of complex waveform communication signals, which may be any one of many such sources well known in the art, generates signals for transmission through a transmission channel 62 to a receiver 112. This transmission channel and receiver, like the low impedance signal source, may be any one of many such which are well known in the art.

In a signal coder 10, the communication signal is applied to a signal sampler 14. This sampler is normally biased in the "off" condition by a potential source, battery 16. This battery is of sufficient voltage that biased signals from the source 12 are always of fixed polarity, here positive.

The signal sampler comprises a transistor 18, a base biasing resistor 20, a coupling capacitor 22 and an input transformer 24. This capacitor and transformer couple enabling input signals to the base of the transistor which is connected in common emitter configuration as shown.

A well-known generator of periodic timing signals 26 provides pulse signals to a frequency divider 28, thence to a pulse stretcher 30 and to the input transformer 24. The timing pulse generator, the frequency divider and the pulse stretcher may be any one of many such circuits well known in the art. Illustrative of such circuits are shown, for example, by J. Millman and H. Taub in "Pulse and Digital Circuits," First Edition, McGraw-Hill Book Company, Incorporated, New York, 1956, at pages 199, 364 and 305, respectively.

The period of the timing pulse generator 26 is adapted to correspond to the period of recurrence of the individual pulses within a code group in accordance with a preassigned code, such as, for example, the aforementioned code of five pulse groups in which successive pulses indicate the values 16, 8, 4, 2 and 1. The frequency divider 28 derives from this succession of timing pulses a second train of pulses having a longer period, for example, a period corresponding to the recurrence period of the individual code groups of the preassigned code. The pulse stretcher 30 lengthens individual ones of this second train of pulses in correspondence to the time interval between the completion of a code group generation and the next amplitude sample to be taken from the communication signal generated by the source 12.

At the beginning of the stretched pulse the sampler is turned "on" and the output signal at the collector electrode of the transistor 18 follows the communication signal wave supplied from the low impedance source 12. At the termination of the stretched pulse the sampler is turned "off" and the last signal value appearing at the collector electrode is encoded as discussed below.

This last signal is applied to energize a tunable reactive circuit element 32. This reactive element comprises a variable capacitor 34 and a tapped inductor 36. By proper adjustment of the variable capacitor 34, the reactive element 32 is conveniently adjusted to antiresonance at a frequency corresponding to the repetition frequency of individual pulses of a code group in accordance with the preassigned code. That is to say, the reactive circuit 32 becomes antiresonant at the frequency of recurrence of pulses from the timing pulse generator 26.

Further, energy is supplied to this circuit in proportion to samples taken from the communication signal wave at periods corresponding to the recurrence of pulse code groups in a train of pulses to be transmitted in accordance with the preassigned code. A terminal 38, common to the capacitor 34 and to the inductor 36, is connected to the base electrode of a second transistor 40. A potential source, as indicated but not shown specifically in this Fig. 1, supplies appropriate biasing potential to the collector electrode of this second transistor. A tap from the inductor 36 is connected through a variable resistor 42 to the emitter electrode of this transistor 40.

The tap from the inductor 36 is appropriately placed such that positive feedback takes place for currents passing through the transistor 40 and such that oscillations at the antiresonant frequency of the circuit 32 tend to increase in amplitude. Adjustment of the resistance value of the resistor 42 controls the rate of this amplitude increase. This oscillatory amplitude rate of increase is adjusted such that successive oscillations below a preassigned level are of greater amplitude than the next preceding oscillatory cycle by a factor of 2.

Thus, the transistor 40 with the associated reactive element 32 and adjustable feedback resistor 42 constitute a well-known Hartley oscillator. This oscillator is made quiescent during the sampling period so that the reactive element 32 is normally devoid of oscillatory energy. When this reactive element is energized by the application of samples of the communication signal generated by the source 12, additional energy is introduced to this element from the potential biasing source indicated as connected to the collector electrode of the transistor 40. This energy is introduced at a rate such that the amplitudes of successive oscillatory cycles of the antiresonant reactive element 32 increase with time in proportion to the initial energizing signal and each is related to the amplitude of the next preceding cycle by a proportionality constant of 2.

Output signals from this antiresonant circuit are applied through a coupling capacitor 44 to a threshold responsive pulse generator 46 which is enabled by pulses from the timing pulse generator 26. Such threshold responsive generators are well known in the art and a convenient one for employment in practice of the invention may be a blocking oscillator such as shown by Millman and Taub at page 283.

This threshold responsive generator or blocking oscillator is biased such that, when enabled by pulses from the generator 26, it is responsive to signals through the capacitor 44 which are at or above a level corresponding to an amplitude range of 16, the largest amplitude represented by a single pulse in accordance with the particular illustrative code. When triggered by a signal of such a level, the blocking oscillator generates a pulse of fixed amplitude which is applied at the transmitting end of transmission channel 62 for further transmission to the receiver 112.

This fixed amplitude pulse also is applied through a delay line 48, which may be a simple resistor-capacitor network well known in the art, requiring none of the pulse sharpening high frequency bandpass characteristics required in the prior art.

Figure 2:
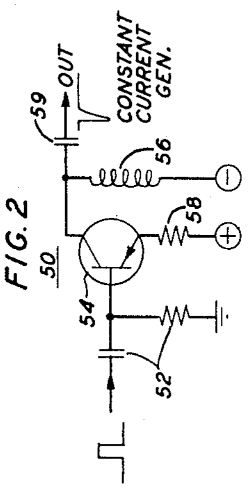
Fig. 2 is a schematic diagram of a circuit detail of the system shown in Fig. 1.

From the delay line this signal is transmitted to trigger a constant current generator 50, such as the generator which is shown in detail in Fig. 2. This constant current generator 50, upon being triggered by the pulse signal from the blocking oscillator 46, generates a fixed current to be applied in subtractive combining relation with the oscillatory currents flowing in the reactive circuit 32. The time delay introduced by the delay line 48 is adjusted by techniques well known in the art such that this applied current is in exact time phase with the oscillatory cycles occurring in this reactive element 32.

Referring briefly to Fig. 2, details of the constant current generator 50 are seen. A positive input pulse signal arriving from the blocking oscillator 46 is coupled through a resistor-capacitor network 52 to the base electrode of a common emitter-connected transistor 54. Potential sources, as indicated but not shown specifically in the drawing, are connected for normally biasing this transistor in a conducting condition through a serially connected inductor 56 and a resistor 58. A capacitor 59 and the inductor 56 have one terminal connected in common to the collector electrode of the transistor 54. This capacitor couples alternating current signal components from the collector to an external circuit.

Application of the positive pulse signal from the blocking oscillator drives the transistor 54 to a nonconducting condition thereby to generate a short negative going pulse of current having an energy content fixed by the normal transistor current and the inductance value of the inductor 56. This negative going pulse is applied to the tuned reactive circuit element 32, as above discussed, to reduce the oscillatory energy therein by a fixed amount as considered heretofore.

Figure 3:
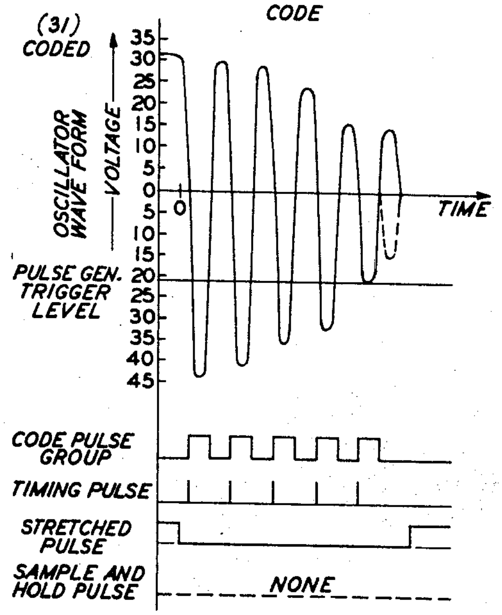
Figs. 3, 4, 5, and 6 are waveforms of assistance in analyzing the operation of the system illustrated by Fig. 1.

Returning now to a consideration of the structures of Fig. 1 in company with the waveforms of Fig. 3, the operations performed by the structure of the invention in translating an illustrative sample of a complex waveform to a code pulse group may serve to clarify the operation of the coding portion of the apparatus delineated in Fig. 1.

As an illustrative wave sample, corresponding to the value 31, is encoded to form a pulse group, the oscillator waveform of Fig. 3 illustrates the signals appearing at the tap on the inductor 36. The pulse generator 46 is biased to respond to a trigger signal below $-22.6$ volts, that is, below $-16\sqrt{2}$ volts. This level is indicated by the solid, horizontal line superimposed on the oscillator waveform.

Beneath the oscillator waveform there are plotted on voltage-time coordinates various associated voltage waveforms in correct time relation with the variations of this oscillator waveform. Preceding the time zero, the complex wave to be encoded is applied directly to the reactive circuit element 32 from the low impedance source 12 and through the transistor 18. This transistor is rendered conducting by the positive value of the pulse derived from the pulse stretcher 30. While transistor 18 is in a conducting condition the energy stored in the reactive element follows exactly the complex wave.

Possible oscillations in this element are prevented by the shunting low impedance of the conducting transistor 18 and the signal source 12. At the time zero, the stretched pulse drops sharply. At this same instant it is assumed the complex waveform has a level corresponding to 31 volts and this value is to be sampled and transmitted in code. Upon the sudden drop in the stretched pulse, the transistor 18 is driven to a nonconducting or "open" condition and the complex wave energy at the level 31 is stored in the reactive element 32. Prior to this drop, any residual energy in the reactive element at the conclusion of a code group generation is dissipated in the aforementioned shunting low impedance while a new signal is being applied to energize the reactive element. Thus, the structure in accordance with the invention not only provides rapid signal sample encoding but eliminates any need for sample deriving circuits external to the coder.

As the transistor 18 passes to an "open" condition at time zero, the shunting low impedance is removed from the reactive element 32 and an oscillation of increasing amplitude proportioned to the complex wave sample is initiated in this reactive element by virtue of its positive feedback connections with the transistor 40.

The initiation of this oscillation leads to a negative going change in the signal appearing at the tap on the inductor 36 as the oscillations tend to increase cyclically by a factor of 2. As the negatively increasing oscillation passes the pulse generator trigger threshold, a timing pulse from the generator 26 is applied to enable the pulse generator 46 which generates a code pulse in a first code position for transmission to the receiver 112. This same code pulse is passed through the delay line 48 to the constant current generator 50 for the generation of a negative going pulse in subtractive time relation with the second positive portion of the oscillatory wave.

The constant current generator output is adjusted to provide an energy dissipating pulse corresponding to an initially applied signal of the value of 16, that is to say, this output pulse reduces the oscillatory amplitude of the positive going arc by an amount corresponding to 16 in the next preceding cycle. Thus, instead of the oscillatory amplitude increasing from 31 to 62 in the second positive cycle in accordance with the designed amplitude characteristics of the oscillator, the amplitude decreases actually to 30.

The next negative going oscillatory loop again descends beyond the pulse generator trigger threshold and initiates a pulse in the second code position as shown. Similar recirculation of this pulse through the feedback loop, including the delay line 48 and constant current generator 50, decreases the third positive going portion of the oscillator wave to an amplitude of 28 volts as an apparent 16 is subtracted from the preceding cycle amplitude of 30 to yield 14. This amplitude of 14, apparently developed in the second positive oscillatory cycle, yields the above-indicated amplitude of 28. Hence, on the next succeeding negative half cycle, a pulse is generated in the third code position. Again, the fourth positive portion of the oscillator wave ascends to an amplitude of 24 as, again, an apparent amplitude of 16 is subtracted from the next preceding cycle and a fourth code pulse is generated. Finally, a fifth code pulse is generated and the oscillator amplitude, attempting to rise to the positive value of 16, is actually reduced to zero by the application of the fifth code pulse in inverse relation to the positive going portion of the oscillator wave as indicated by the dotted negative going wave in the figure. Thus, five pulses are generated as shown to constitute a code group indicating a complex wave sample amplitude of the value of 31.

Figure 5:
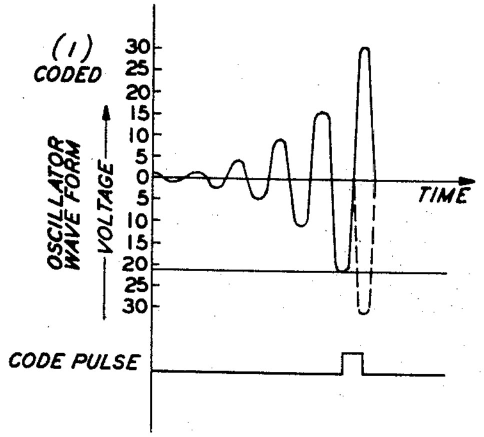

The operation of the coder structure may be further clarified in detail with reference to the oscillator waveform of Fig. 5 where a signal sample corresponding to an amplitude of 1 is applied to the reactive element 32. The amplitude of the oscillation increases in successive cycles by a factor of 2. Thus, in the second cycle it has reached only a positive amplitude of 2, in the third cycle an amplitude of 4 and in the fourth positive cycle an amplitude of 8. None of these amplitudes are sufficient to trigger the threshold responsive pulse generator 46. In the fifth cycle, however, the oscillator amplitude increases to a positive amplitude of 16 and in its following negative excursion triggers the generator to initiate a pulse in the fifth code position. As seen above, this pulse reduces the oscillatory amplitude to zero in the next positive going swing. Thus, the amplitude 1 is encoded as a single pulse occurring in the fifth code pulse position.

Turning attention again to Fig. 1, the pulse code group generated as heretofore described is transmitted through a transmission channel 62 toward a receiver 112 through a decoder 100. Here it is applied to a pulse regenerator 72 which may conveniently be a pulse regenerator such as taught in L. R. Wrathall Patent Number 2,703,368, granted March 1, 1955. Associated with this pulse regenerator 72 is a timing pulse generator 74 for generating enabling pulses corresponding to the pulse repetition frequency in accordance with the preassigned code. This pulse generator is conveniently synchronized with and by the auxiliary oscillator signals generated in the Wrathall pulse regenerator. This synchronization is accomplished in accordance with the teachings of Millman and Taub, cited above, at pages 379 and 380. In the pulse regenerator 72, received code pulses are restored in form to eliminate any distortions imposed upon them in passage through the transmission channel 62.

These restored pulses are applied to a constant current generator 80 which is similar in construction to that detailed in Fig. 2. It differs only in that it is designed to yield a positive pulse instead of a negative one to combine with a positive going portion of the oscillation cycle in additive rather than subtractive relation. Conveniently, this signal inversion is accomplished by a simple inverting transformer output coupling stage.

This constant current generator 80 applies pulses of fixed energy content to a reactive circuit element 82 comprising a capacitor 84 and a tapped inductor 86, both of which are adjusted to make the reactive element 82 antiresonant at the pulse repetition frequency of code pulses in accordance with the preassigned code. This circuit is connected in positive feedback relation between the emitter and base electrodes of a transistor 90, thereby to constitute a conventional Hartley oscillator. A variable resistor 102 connected in this feedback path is adjusted so that the successive oscillations in the reactive element 82 increase by a factor of 2. Shunting this reactive element to ground is the collector to emitter path of a transistor 98 which has a base biasing resistor 99 connected between base and emitter electrodes.

Figure 4:
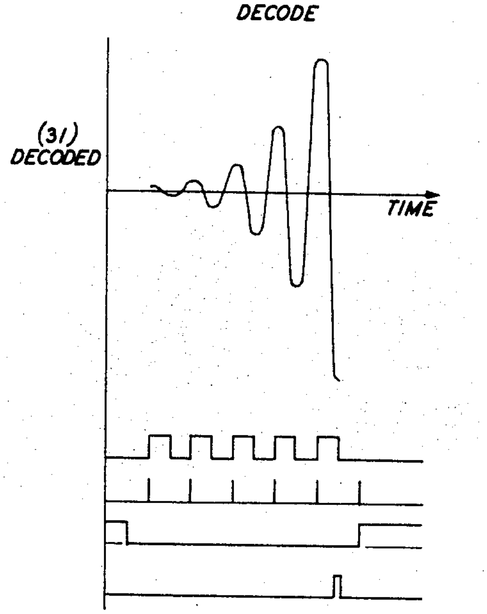

A Sample and Hold circuit 100 such as, for example, the sampling circuit disclosed in Fig. 4 of the aforementioned Rack patent, is capacitively coupled through a variable resistor 102 and capacitor 104 to receive signals from a tap on the inductor 86 of the reactive element 82.

A sampling signal, i.e. a Sample and Hold pulse, is applied to this Sample and Hold circuit from the timing pulse generator 74 through a frequency divider 76 adjusted, in well-known fashion, to yield a signal at the end of each code group of pulses. This frequency divider signal is passed through a delay line 77, constructed in a fashion well known in the art, and acts as a trigger pulse to enable the Sample and Hold circuit to sample the waveform of the reactive element at the precise moment indicated in the discussion below. The sample so taken is proportioned directly to the sample signal taken from the source 12 and transmitted as a code group of pulses. This proportionate signal is then applied to the receiver 112 where, in accordance with the Nyquist Sampling Theorem, it may, with other proportionate signals, represent the original complex wave derived from the signal source 12.

The timing pulse generator 74 provides signals not only to the Sample and Hold circuit but also through the frequency divider 76 to a pulse stretcher 78. The so stretched frequency divider pulses are applied through a capacitor 79 to the base electrode of the transistor 98 to bias that transistor 98 "on" from the completion of each decoding operation until the beginning of the next as shown. Thus the reactive element 82 is shunted to ground and any oscillatory tendencies in that element are dissipated.

Figure 6:
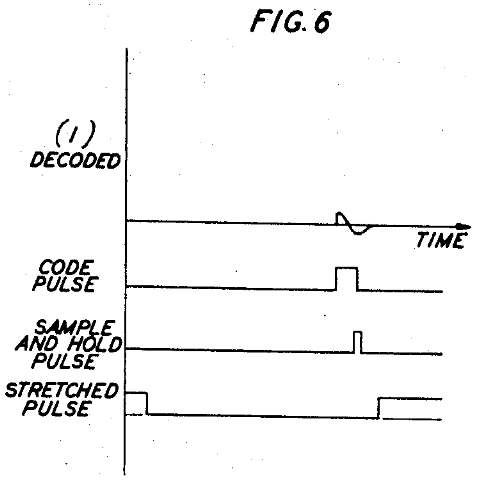

The operation of this illustrative decoder embodiment of the invention may be more clearly understood by a consideration of the waveforms shown in Figs. 4 and 6 taken together with the structural details of Fig. 1.

As does its companion Fig. 3, Fig. 4 illustrates the waveform appearing on the reactive element associated with an oscillator of an increasing amplitude characteristic, here the reactive element 82. Below this oscillatory waveform are arranged the waveforms generated by other portions of the decoder structure. These other waveforms are arranged in time relationship with the oscillatory waveform consistent with proper operation of this decoder structure in accordance with the invention.

Just prior to the arrival of the first code pulse of the five pulse group illustrated in both Figs. 3 and 4, the stretched pulse from the pulse stretcher 78 drops sharply. The reactive element 82 rests in a deenergized condition having been discharged during the stretched pulse through the transistor 98. This transistor is now driven to an "open" condition by the sharp drop in the stretched pulse.

The first pulse of the arriving code group shown actuates the constant current generator 80 to introduce a fixed amount of energy to the reactive element at the relative level of 1. Oscillations are initiated in this element with a negative voltage swing as the oscillatory amplitude tends to double in the next cycle. Falling to a level of $-1\times\sqrt{2}$, i.e. to $-1.414$, this voltage tends to rise to a value of 2 but the second code pulse drives the oscillation to a positive amplitude of 3. The third code pulse causes a third oscillatory positive swing of 7, not 6, the fourth pulse an amplitude of 15, and the fifth pulse a positive amplitude of 31. This amplitude is exactly the amplitude of the sample originally encoded as shown in Fig. 3.

As the oscillator swings negatively from this fifth positive excursion, the Sample and Hold pulse is applied through the delay line 77 in the third quarter of the oscillatory cycle. This timing of the sampling pulse insures that the oscillatory wave is sampled during the interval when its rate of change of amplitude is at a minimum. Thus possible perturbations in the timing circuitry are discounted.

Inspection of the waveforms of Fig. 6, in light of the above discussion, may serve to clarify the operation of the decoder of the invention. Here a single code pulse occurring in the fifth or last code pulse interval to represent an amplitude sample of 1 is shown. During the first positive portion of the stretched pulse shown, all energy in the reactive element 82 is drained through the transistor 98. At the termination of the stretched pulse, the transistor 98 is driven to a nonconducting condition and the reactive element is conditioned to initiate oscillations. No energy is received from the constant current generator 80, however, until the arrival of the pulse in the fifth code pulse position. When that pulse does arrive, the oscillator is energized at the level of 1 by the fixed amount of energy applied from the generator 80. The timing of this code pulse, however, permits only one portion of the oscillatory cycle before the arrival of the delayed pulse from delay line 77 directs the Sample and Hold circuit to extract the amplitude of that oscillation and to apply it to the receiver 112. Thereafter an oncoming stretched pulse drains the oscillatory energy from the reactive element through the transistor 98.

Were a number intermediate the illustrative 1 and 31 to be encoded and decoded by the apparatus in accordance with the invention, say, for example, the number 5, it will be clear from the foregoing discussion that the positive portions of successive encoder oscillations reach amplitudes of 5, 10, 20, 8, and 16. These oscillatory waves would then result in the generation of code pulses in the third and fifth code pulse positions. Similarly, in the decoding of these code pulses the successive oscillatory cycles of the decoder structure in accordance with the invention have positive amplitudes of 0, 0, 1, 2, and 5. The variations of these oscillator amplitude and code pulse combinations for the code processing of wave samples of other levels from zero to 31 will be apparent to those skilled in the art.

From a consideration of the above brief description of the operation of illustrative coder and decoder embodiments of the invention it will be further clear to those skilled in the art that many and varied other arrangements may be made without departing from the principles of the invention. It will be clear, for example, that the threshold responsive pulse generator described may as well be triggered by a positive going portion of an oscillatory cycle. It will be clear too that code pulses may be applied directly in combining relation with the oscillatory signals without benefit of the constant current generator shown. By way of further example, it will be clear, too, that the illustrative decoder structure in accordance with the invention may be simply adapted to perform encoding functions. Such variants and others are all within the contemplation of the invention.

What is claimed is:

1. In a system for establishing a counterpart relationship between a first signal proportioned to an instantaneous value of a complex wave of limited full amplitude range and a second signal comprising a code group of two-valued pulses occurring in equally time-spaced intervals, each pulse of said code group being related to a portion of said amplitude range in accordance with a preassigned code, the combination which comprises a tuned element having a resonant frequency related to the time spacing of said intervals, means for initiating oscillation in said tuned element of an amplitude in proportion to one of said signals, a signal controlled energy source connected in circuit with said tuned element for supplying energy thereto in time phase with and in proportion to oscillations therein, whereby the amplitude of said oscillations increases with time, output means connected in circuit with said tuned element for generating code pulses of said group in response to oscillations of certain amplitudes in said element, and means connecting said output means in circuit with said tuned element for applying successive pulses of said code group in combining relation with oscillations of said tuned circuit, whereby the amplitude of said oscillations is related to the amplitude represented by said signals in accordance with the preassigned code.

2. In a system for converting an amplitude sample of a signal wave of limited full amplitude range into a code group of two-valued pulses occurring in equally time-spaced intervals, each pulse of one value representing a portion of said amplitude range in accordance with a preassigned code, the combination which comprises a tuned element having a resonant frequency related to the time spacing of said intervals, a signal controlled energy source connected in circuit with said tuned element for supplying energy to said element in time phase with and in proportion to oscillations therein, whereby the amplitude of said oscillations increases with time, means for applying an amplitude sample of said signal wave to said tuned element, thereby to initiate oscillations therein, threshold responsive means for generating code pulses in response to an input signal having an amplitude greater than a preassigned level, feedback means for combining said code pulses in subtractive relation with oscillations of said tuned circuit, and means for applying oscillations of said circuit to trigger said threshold responsive generator.

3. Apparatus as set forth in claim 2 wherein said sample applying means comprises a low impedance and a signal controlled switch connected in series with said tuned element, and means for applying a first control signal to place said switch in a low resistance condition, whereby energy in said tuned circuit is dissipated in said low impedance.

4. Apparatus as set forth in claim 3 and in combination therewith means for applying a second control signal to place said switch in a high impedance condition thereby to isolate said tuned circuit from said dissipating impedance whereby oscillations are initiated in said tuned circuit in proportion to the energy in said circuit upon application of said second control signal.

5. Apparatus for transmitting successive samples of a complex wave signal from a low impedance source to a receiver which comprises an oscillator having an increasing amplitude characteristic and an oscillatory frequency proportioned to the pulse repetition rate in accordance with a preassigned code, said oscillator comprising a reactive load element, means for connecting said impedance source in shunting relation with said load circuit, signal controlled means for isolating said low impedance source from said load circuit, and signal generating means connected in circuit with said isolating means whereby oscillations are initiated in said oscillator in proportion to the value of said wave at the occurrence of an isolating signal from said signal generating means.

6. Apparatus as set forth in claim 5 wherein said connecting means comprises signal responsive means connected in circuit with said signal generating means, whereby oscillations in said load circuit are damped upon termination of said isolating signal.

7. A communication system for transmitting a sample of a complex wave signal of limited full amplitude range between a first station and a second station, wherein said first station comprises apparatus as set forth in claim 2, and in combination therewith transmission means interconnecting said threshold responsive generator with said second station, said second station comprising a second tuned element having a resonant frequency corresponding to that of said first-named tuned element, said second tuned element being connected for receiving signals from said transmission means, a signal controlled energy source connected in circuit with said second tuned element for applying energy thereto in proportion to and in response to oscillations occurring therein, said proportion being defined by said preassigned code, and means for periodically deriving a signal proportioned to the amplitude of oscillations in said second tuned element.

References Cited in the file of this patent

UNITED STATES PATENTS 2,448,543 Moore ---------------- Sept. 7, 1948